(12) United States Patent
Jayaram

(10) Patent No.: US 12,385,460 B2
(45) Date of Patent: Aug. 12, 2025

(54) WAVE ENERGY HARVESTER

(71) Applicant: Narsimhan Jayaram, Singapore (SG)

(72) Inventor: Narsimhan Jayaram, Singapore (SG)

(73) Assignee: Narsimhan Jayaram, Singapore (SG)

( * ) Notice: Subject to any disclaimer, the term of this patent is extended or adjusted under 35 U.S.C. 154(b) by 9 days.

(21) Appl. No.: 18/569,712

(22) PCT Filed: May 24, 2022

(86) PCT No.: PCT/IB2022/054826
§ 371 (c)(1),
(2) Date: Dec. 13, 2023

(87) PCT Pub. No.: WO2023/275631
PCT Pub. Date: Jan. 5, 2023

(65) Prior Publication Data
US 2024/0384697 A1    Nov. 21, 2024

(30) Foreign Application Priority Data

Jul. 1, 2021    (AU) ................................ 2021902009

(51) Int. Cl.
*F03B 13/18*    (2006.01)
*B63B 35/44*    (2006.01)
*B63H 19/02*    (2006.01)

(52) U.S. Cl.
CPC .. *F03B 13/1845* (2013.01); *B63B 2035/4466* (2013.01); *B63B 2209/14* (2013.01);
(Continued)

(58) Field of Classification Search
CPC .................. F03B 13/1845; F03B 13/20; F05B 2220/7068; F05B 2250/44;
(Continued)

(56) References Cited

U.S. PATENT DOCUMENTS

| 861,997 A | * | 7/1907 | Lück | ....................... F03B 13/22 60/501 |
| 3,231,749 A | * | 1/1966 | Hinck, III | ............ H02K 7/1853 415/7 |

(Continued)

FOREIGN PATENT DOCUMENTS

| EP | 4461950 A1 * | 11/2024 | ............. F03B 13/20 |
| GB | 2022716 A | 12/1979 | |

OTHER PUBLICATIONS

International Search Report; WO 2023/275631—Jan. 5, 2023.

*Primary Examiner* — Pedro J Cuevas
(74) *Attorney, Agent, or Firm* — Sand, Sebolt & Wernow Co., LPA

(57) ABSTRACT

The disclosure relates generally to a wave energy harvester, comprising: a housing locatable aboard a floating platform; an armature coil fixedly mounted to the housing, the armature coil having a magnet associated therewith; and a body travelable along a track located within an interior of the housing, the body being coupled to the magnet; wherein, in use, wave-induced periodic motion of the floating platform results in reciprocating travel of the body along the track, with the travel of the body driving movement of the magnet with respect to the armature coil to thereby generate electricity.

20 Claims, 8 Drawing Sheets

(52) U.S. Cl.
CPC ...... *B63H 19/02* (2013.01); *F05B 2220/7068* (2013.01); *F05B 2240/93* (2013.01); *F05B 2250/44* (2020.08); *Y02E 10/30* (2013.01)

(58) Field of Classification Search
CPC ....... F05B 2220/707; B63B 2035/4466; B63B 2209/14; B63H 19/02; Y02E 10/30; H02K 35/02
See application file for complete search history.

(56) References Cited

U.S. PATENT DOCUMENTS

| | | | | |
|---|---|---|---|---|
| 3,774,048 | A * | 11/1973 | Hardingham | B63J 3/04 440/10 |
| 4,092,554 | A * | 5/1978 | Quinn | B60L 7/10 105/35 |
| 4,110,630 | A * | 8/1978 | Hendel | H02K 35/02 310/11 |
| 4,266,143 | A * | 5/1981 | Ng | F03B 13/20 60/505 |
| 4,316,704 | A * | 2/1982 | Heidt | F03D 9/28 417/100 |
| 4,317,047 | A * | 2/1982 | de Almada | F03B 13/141 416/86 |
| 4,340,821 | A * | 7/1982 | Slonim | F03B 13/187 60/495 |
| 4,851,704 | A * | 7/1989 | Rubi | F03B 13/20 417/332 |
| 7,105,939 | B2 * | 9/2006 | Bednyak | F03B 13/20 290/1 R |
| 7,239,038 | B1 * | 7/2007 | Zimmerman | F03B 13/20 290/43 |
| 7,375,436 | B1 * | 5/2008 | Goldin | F03G 7/08 74/61 |
| 7,453,165 | B2 * | 11/2008 | Hench | F03B 13/20 290/53 |
| 7,554,215 | B1 * | 6/2009 | Caragine | F03B 17/06 290/43 |
| 7,629,704 | B2 * | 12/2009 | Hench | F03B 13/20 290/53 |
| 7,737,569 | B2 * | 6/2010 | Hench | F03B 13/20 290/55 |
| 7,755,224 | B2 * | 7/2010 | Beane | F03B 13/20 310/12.12 |
| 7,768,144 | B2 * | 8/2010 | North | F03B 13/1805 290/53 |
| 7,989,975 | B2 * | 8/2011 | Clement | F03B 13/20 290/53 |
| 8,004,104 | B2 * | 8/2011 | Hench | F03B 13/20 60/507 |
| 8,046,108 | B2 * | 10/2011 | Hench | F03B 13/20 700/286 |
| 8,269,365 | B2 * | 9/2012 | Clement | F03B 13/20 290/1 R |
| 8,334,605 | B2 * | 12/2012 | Catinella | F03G 7/08 290/53 |
| 8,334,611 | B2 * | 12/2012 | Shreider | F03B 11/08 290/53 |
| 8,519,557 | B2 * | 8/2013 | Beane | H02K 7/1853 60/495 |
| 8,614,521 | B2 * | 12/2013 | Babarit | F03B 13/20 290/53 |
| 8,701,403 | B2 * | 4/2014 | Beane | F03B 13/20 60/498 |
| 8,766,470 | B2 * | 7/2014 | Beane | H02K 7/1876 290/53 |
| 8,915,078 | B2 * | 12/2014 | Beane | F03B 13/20 60/505 |
| 9,151,268 | B1 * | 10/2015 | Fouli | F03B 13/20 |
| 9,458,819 | B2 * | 10/2016 | Wanni | F03B 13/148 |
| 9,976,535 | B2 * | 5/2018 | Beane | F03B 13/182 |
| 10,027,202 | B2 | 7/2018 | Dolman | |
| 10,060,408 | B2 * | 8/2018 | Vamvas | H02K 7/1823 |
| 10,533,531 | B2 * | 1/2020 | Vamvas | H02K 7/1823 |
| 10,947,951 | B2 * | 3/2021 | Vamvas | H02K 7/1823 |
| 11,480,147 | B2 * | 10/2022 | Vamvas | H02S 10/10 |
| 12,234,800 | B2 * | 2/2025 | Podhola | F03B 13/18 |
| 2007/0116565 | A1 * | 5/2007 | Beane | F03B 13/20 416/11 |
| 2007/0138793 | A1 * | 6/2007 | Zimmerman | F03G 7/08 290/1 R |
| 2007/0251230 | A1 * | 11/2007 | Zimmerman | F03G 3/06 60/497 |
| 2008/0093858 | A1 * | 4/2008 | Hench | F03B 13/20 290/53 |
| 2008/0224472 | A1 * | 9/2008 | Bean | F03G 3/00 290/53 |
| 2008/0265582 | A1 * | 10/2008 | Hench | F03B 13/20 290/53 |
| 2009/0008942 | A1 * | 1/2009 | Clement | F03B 13/20 60/497 |
| 2009/0127856 | A1 * | 5/2009 | Hench | F03B 13/20 700/286 |
| 2009/0160191 | A1 * | 6/2009 | Beane | F03B 13/20 290/53 |
| 2010/0032946 | A1 * | 2/2010 | Begley | H02K 35/02 290/1 R |
| 2010/0102564 | A1 * | 4/2010 | Hench | F03B 13/20 290/53 |
| 2010/0123313 | A1 * | 5/2010 | Hobdy | F03G 7/08 290/42 |
| 2010/0228401 | A1 * | 9/2010 | Hench | F03B 13/20 700/287 |
| 2011/0084502 | A1 | 4/2011 | Ghassemi | |
| 2011/0185719 | A1 * | 8/2011 | Beane | F03B 13/182 60/497 |
| 2011/0187101 | A1 * | 8/2011 | Beane | F03B 13/00 290/53 |
| 2013/0341921 | A1 * | 12/2013 | Beane | F03B 13/20 290/42 |
| 2015/0107239 | A1 * | 4/2015 | Beane | F03B 13/182 60/505 |
| 2015/0260150 | A1 | 9/2015 | Sullivan | |
| 2020/0109694 | A1 * | 4/2020 | Vamvas | H02K 7/1823 |
| 2021/0285415 | A1 * | 9/2021 | Vamvas | B63B 35/44 |
| 2023/0167797 | A1 * | 6/2023 | Vamvas | B63B 35/44 290/53 |
| 2024/0068434 | A1 * | 2/2024 | Podhola | F03B 13/1815 |

\* cited by examiner

WAVE ENERGY HARVESTER

TECHNICAL FIELD

The present invention relates to a device for generating electricity. In particular, the invention relates to a device that harvests wave energy to produce electricity.

BACKGROUND

Given the growing need to reduce our carbon footprint, alternative non-fossil fuel-based energy sources are becoming increasingly important around the world. The drive to produce environmentally friendly, yet commercially viable energy has seen significant investment in clean energy technologies.

The world's oceans represent a substantial potential energy source, estimated as being capable of meeting global demand twice over. Furthermore, when compared to the highly weather dependent outputs from wind and solar energy, ocean power provides a highly reliable and predictable alternative.

Methods of tapping ocean energy can broadly be divided into tidal and wave technology. Whilst tidal technology relies on the potential energy related to the rise and fall of sea levels, wave energy is harvested from the kinetic energy of waves as they move along the surface of the ocean. Because wave technology provides a continuous source of energy (as opposed to the periodic output of tidal energy), wave technology is particularly attractive to coastal and island communities where it has the potential to be a mainstay renewable energy source that does not require significant storage or backup generation options.

Existing wave energy harvesting devices typically require direct contact with the water, relying on a buoyancy difference between the crest and trough of a wave or the forward momentum of waves to drive an oscillating water column that extracts energy from the waves. Such devices have limited effectiveness, leading to high energy costs. Further, as many such devices are located at a significant distance from shore and/or in harsh oceanic environments, regular maintenance and damage repair is an expensive and arduous task.

Accordingly, it would be advantageous to provide an improved device for harvesting wave energy. It would be beneficial to provide a device that was suitable for harvesting wave energy both close to shore and far from shore. It would be desirable if such a device was simple to maintain. The present invention was conceived with these shortcomings in mind.

SUMMARY

In a first aspect, there is provided a wave energy harvester, comprising: a housing locatable aboard a floating platform; an armature coil mounted to the housing, the armature coil having a moveable magnet associated therewith; and a momentum module located within the housing, the momentum module including a body that is selectively travelable and configured to drive a corresponding movement of the magnet; wherein, in use, kinetic energy of the floating platform is transferred to the momentum module, with reciprocating travel of the body within the housing generating electricity.

In a second aspect, there is provided a wave energy harvester, comprising: a housing locatable aboard a floating platform, the housing providing an interior that is isolated from a marine environment within which the floating platform is situated; an armature coil mounted to the housing, the armature coil having a moveable magnet associated therewith; and a body coupled to the magnet and selectively travelable along a track located within the interior of the housing and extending in a substantially flat plane; wherein, in use, kinetic energy from the floating platform is transferred to the body, with reciprocating travel of the body along the track driving a corresponding movement of the magnet with respect to the stationary armature coil to thereby generate electricity.

An advantage provided by the present invention lies in its reliance upon the rolling motion inherent of the floating platform upon which the device is mountable to drive movement of the magnet, without the need of directly exposing the body to the marine environment.

The disclosure relates generally to a wave energy harvester, comprising: a housing locatable aboard a floating platform; an armature coil fixedly mounted to the housing, the armature coil having a magnet associated therewith; and a body travelable along a track located within an interior of the housing, the body being coupled to the magnet; wherein, in use, wave-induced periodic motion of the floating platform results in reciprocating travel of the body along the track, with the travel of the body driving movement of the magnet with respect to the armature coil to thereby generate electricity.

The interior of the housing may be isolated from the marine environment within which the floating platform is situated. The housing may be watertight. Decoupling of the components within the interior of the housing from the marine environment advantageously provides a device with improved serviceability and survivability within the marine environment. Furthermore, because the armature coil and travelling body are sheltered within the housing, the present invention makes use of readily available componentry that would otherwise be unsuitable for use in such a harsh environment.

In some embodiments, the magnet may be carried by the body. The movement of the magnet may be a translational movement. The traversal of the body along the track may carry the magnet through the armature coil. The linear travel of the body along the track with respect to the armature induces a current therein to thereby generate electricity through magnetic induction.

In alternative embodiments, the wave energy harvester may further comprise a first engagement member carried by the body that is configured to engage with a second engagement member associated with the armature coil, the magnet being attached to the second engagement member. The movement of the magnet may be a rotational movement. The linear travel of the body along the track imparts a rotation to the second engagement member, and the resulting rotation of the magnet attached thereto induces a current within the armature coil to thereby generate electricity through magnetic induction.

The track of the wave energy harvester may extend in a linear direction. The track may extend at least partly along a length of the floating platform and the body may travel along the track in response to periodic rotational motion of the floating body in pitch. Alternatively, the track may extend at least partly across a beam of the floating platform and the body may travel in response to periodic rotational motion of the floating body in roll. In a further alternative, the track may be mounted to a turntable fixed to the floating platform thereby enabling the body to travel along the track in response periodic rotational motion in both roll and pitch.

Accordingly, the invention does not rely on the buoyancy provided by the difference in height between the crest and trough of a wave or on the forward momentum of the waves but instead on the continuous, and predictable roll and pitch motion that the floating platform is subjected to by the ocean waves.

In some embodiments, the wave energy harvester may further include a locking element adapted to hold the body in a fixed position against gravity. The locking element may comprise a solenoid configured to release the body when the floating platform is at a peak of its periodic motion.

The body may have a mass of at least 90 tonnes. A shock absorber may be located towards an end of the track. The shock absorber may be adapted to dissipate energy forces associated with stopping the body.

The body may be a railway bogie. The electricity generated may be at least 180 kilowatts. By repurposing a railway bogie for use in the wave energy harvester, the need for building a bespoke body is removed, whilst providing a second use for the bogie that would otherwise be condemned to waste or scrap. This has both environmental and economic (i.e. reduced cost) benefits.

The floating platform may be a floating vessel, such as a ship. Alternatively, the floating platform may be a substantially stationary floating structure, such as a concrete gravity structure. Being substantially platform agnostic, the wave energy harvester can be used in several locations, both close to and far from shore.

In a further aspect, the invention provides a self-propelled vessel comprising an energy harvester as described herein. The vessel may further comprise at least one aerodynamic surface configured to augment the wave-induced periodic motion thereof. By augmenting the wave-induced motion of the vessel, the energy generated by the wave harvester aboard can be optimised.

BRIEF DESCRIPTION OF THE DRAWINGS

Embodiments of the invention are illustrated by way of example, and not by way of limitation, with reference to the accompanying drawings, of which.

Figure 1:
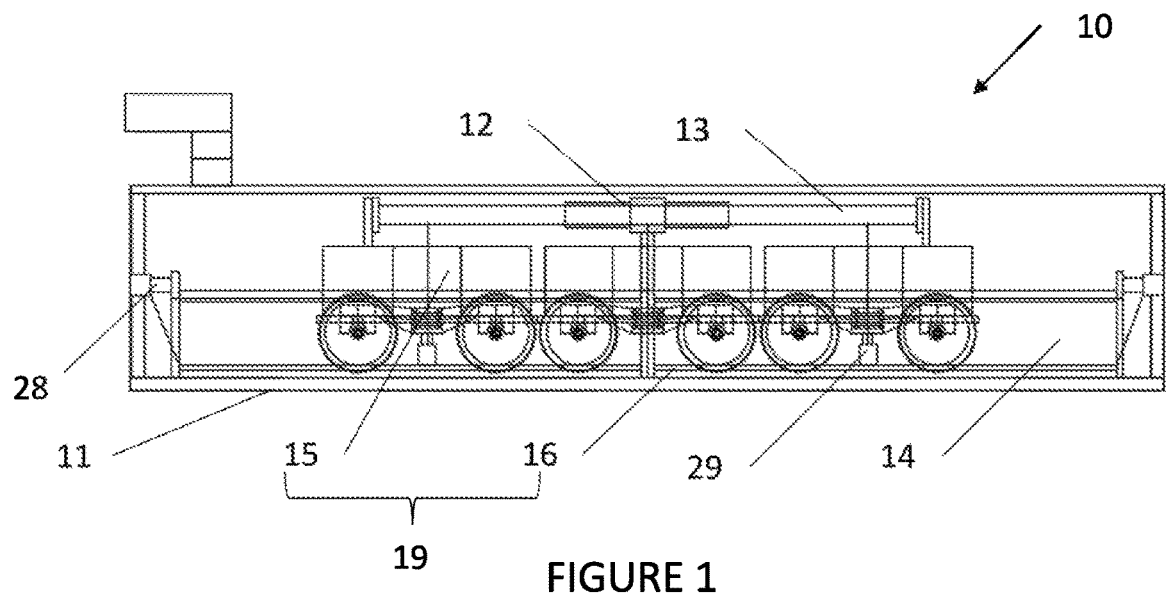
FIG. 1 is a side sectional view of a wave energy harvester according to an embodiment of the invention, showing a momentum module that directly moves a magnet with respect to an armature to generate electricity.
Figure 2:
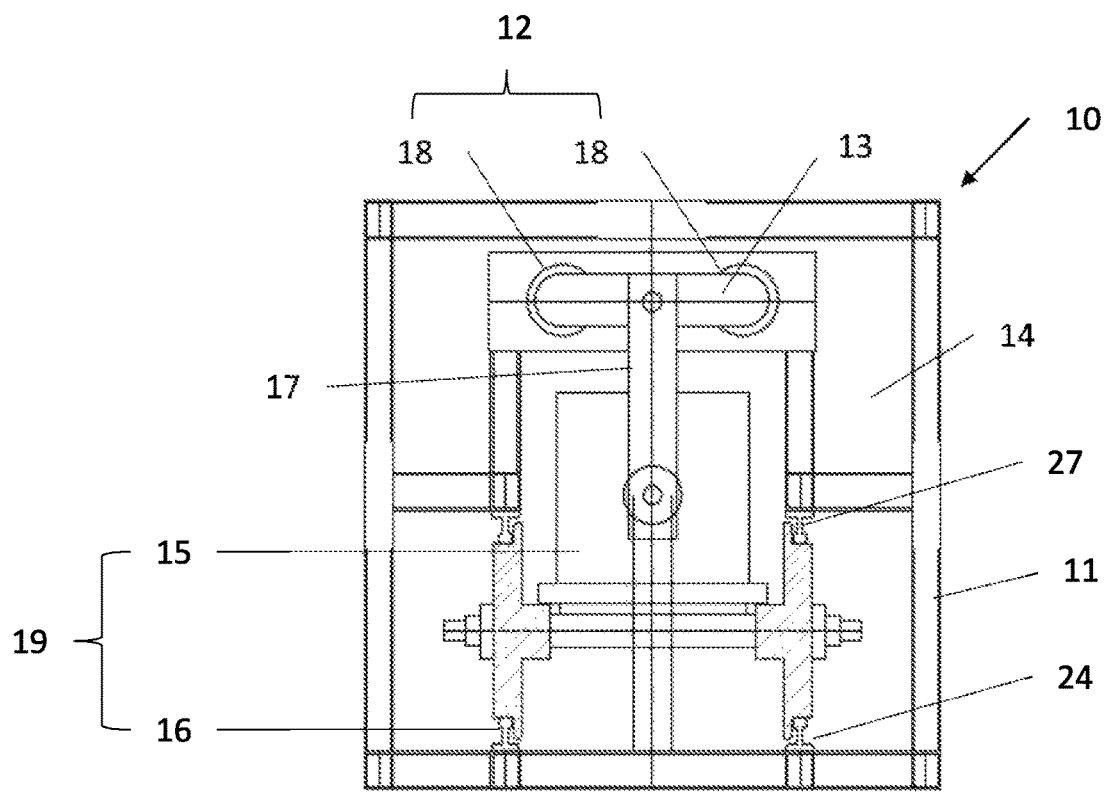
FIG. 2 is a front sectional view of the harvester of FIG. 1.

Embodiments will now be described more fully hereinafter with reference to the accompanying drawings, in which various embodiments, although not the only possible embodiments, of the invention are shown.

DETAILED DESCRIPTION

In general terms, embodiments of the invention as illustrated in the Figures relate to a wave harvesting device or harvester 10 for generating electricity. The device 10 includes a housing 11. The housing 11 is locatable aboard a floating platform P, such as a ship or rig. The platform P is subject to periodic motion from waves within a marine environment. An armature coil 12 is fixedly mounted to the housing 11. The armature coil 12 has a magnet 13 associated therewith. Within an interior 14 of the housing 11, a body 15 is engaged with a track 16 to allow it to travel along the track. The periodic motion of the platform P from the waves results in reciprocating travel of the body 15 along the track 16. The body 15 is coupled to the magnet 13, such that travel of the body 15 along the track 16 drives a corresponding movement of the magnet 13. Relative movement of the magnet 13 with respect to the armature 12 results in a changing magnetic field F about the armature coil 12. Changes in the magnet field F about the armature coil 12 induces an electrical current within the armature coil 12, thereby generating electricity through magnetic induction.

FIGS. 1 to 4 show an embodiment of the harvester 10, in which the magnet 13 is carried by the body 15.

Best shown in FIG. 1, the armature coil 12 is fixedly mounted to the housing 11 via supports 17. The armature coil 12 is located substantially midway along the track 16, between the first and second ends of the housing 11. The armature 12 comprises a pair of tubular coils 18, extending parallel to and in the same direction of track 16.

Figure 5:
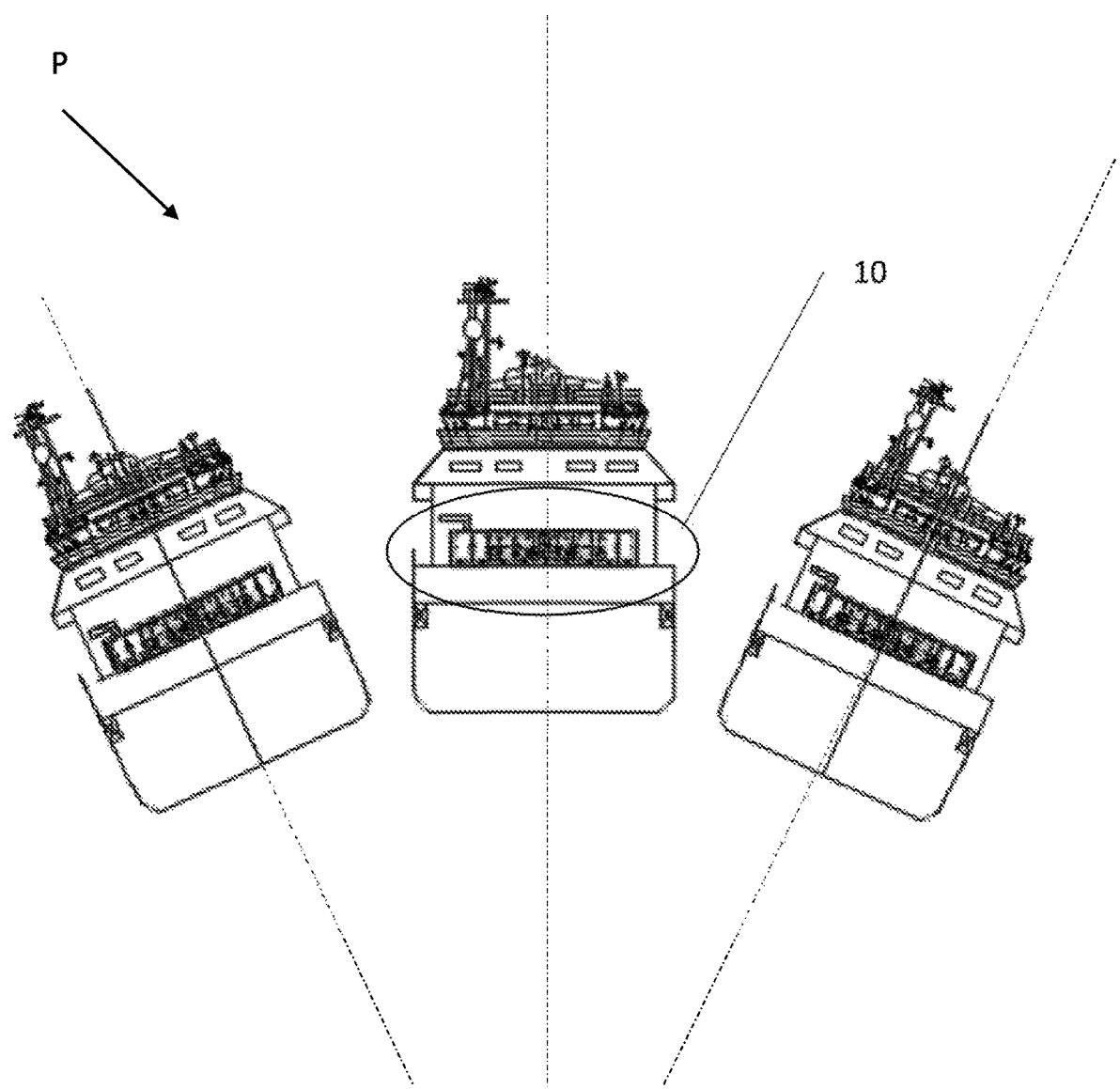
FIG. 5 shows the harvester of FIG. 1 located aboard a deck of a ship, with rotational motion of the ship resulting in travel of the momentum module.

Together, the body 15 and track 16 form a momentum module 19. Turning briefly to FIG. 5, which shows the harvester 10 located aboard a deck of a tanker vessel, extending across the beam thereof. In the case of large ocean-borne platforms such as oil rigs and vessels such as oil tankers the pitch and roll of the platform experienced can be in the magnitude of 10 degrees. As the ship rolls about its length or surge axis towards the port side, the body 15 of the momentum 19 module is urged along the track 16 towards the port side. Similarly, as the ship rolls towards the starboard side, the body 15 is urged towards the starboard side. The kinetic energy of the waves is thus transferred into the momentum module 19 via the traversal of the body 15 along the track 16.

Figure 3:
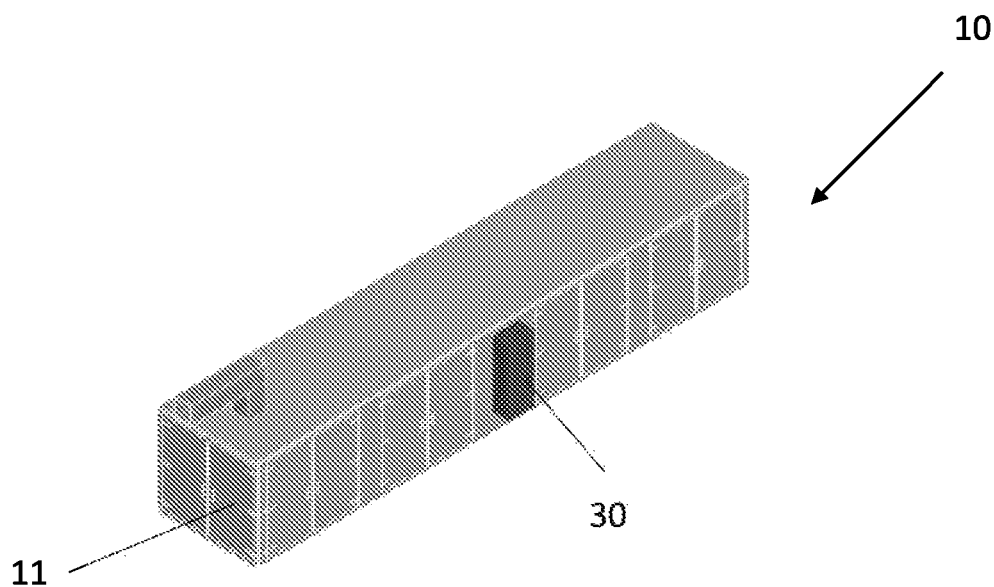
FIG. 3 is a perspective view of the harvester of FIG. 1, showing a housing enclosing the momentum module.

An underlying principal of the present invention is the indirect transfer of kinetic energy from the waves to the kinetic energy of the momentum module 19. By indirect transfer, what is meant is that the momentum module 19 does not rely on direct contact with the waves and/or marine environment. Rather, the momentum module 19 relies on the inherent periodic motion of the floating platform P. As shown in FIG. 3, the housing 11 is a watertight housing. A ventilation system comprising ventilation fans provides fluid communication between the interior 14 of the housing and the external environment, so as to maintain a controlled interior environment. The momentum module 19 is completely enclosed within the interior 14 of the housing 11. As such the momentum module 19 is not exposed to the harsh marine environment that would otherwise be the case. Furthermore, because the momentum module 19 is located with the housing 11 aboard the platform itself, the components thereof can easily be inspected and maintained by crew and personnel, without the need for costly and potentially dangerous under-water investigations.

Figure 4:
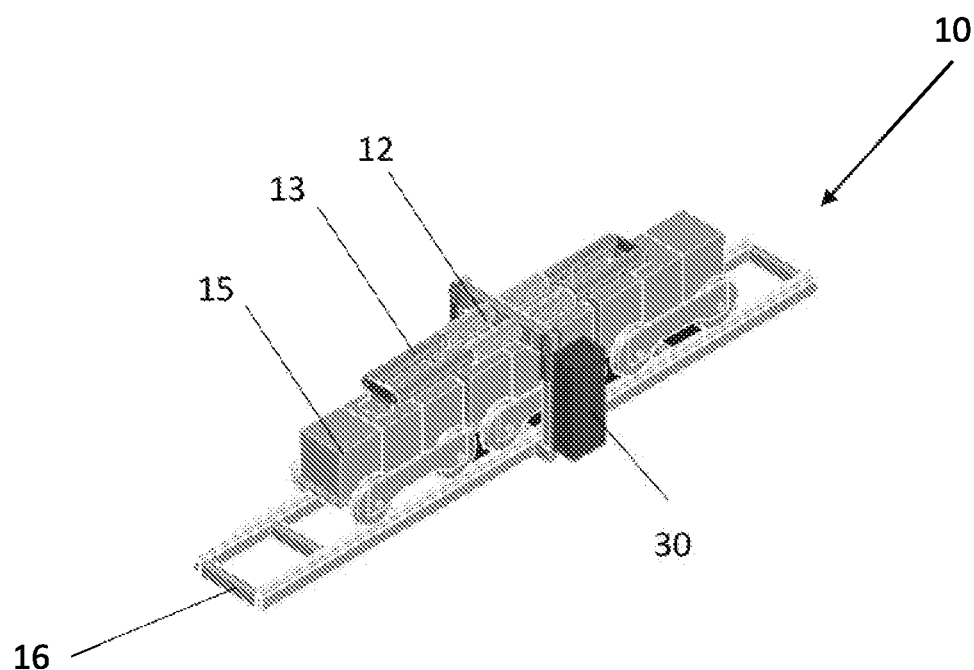
FIG. 4 is cut-away view of FIG. 3 with the housing removed.

Best shown in FIGS. 1 and 4, the magnet 13 comprises a pair of magnetic rods, that extend through a central bore of the respective tubular coils 18 of the armature 12. The magnetic rods are supported at either end thereof by a pair of linkages 15. The linkages 15 are fixedly attached to the body 15. Accordingly, as the body 15 travels along the track, the magnet 13, carried thereby, is also driven along the track, through the stationary armature coil 12. Movement of the magnet 13 with respect to the stationary armature 13 causes a change in the magnetic field F associated therewith, thus inducing a current within the coils 18 of the armature 12. Accordingly, the kinetic energy of the momentum module 19 is converted into electrical energy.

Figure 6:
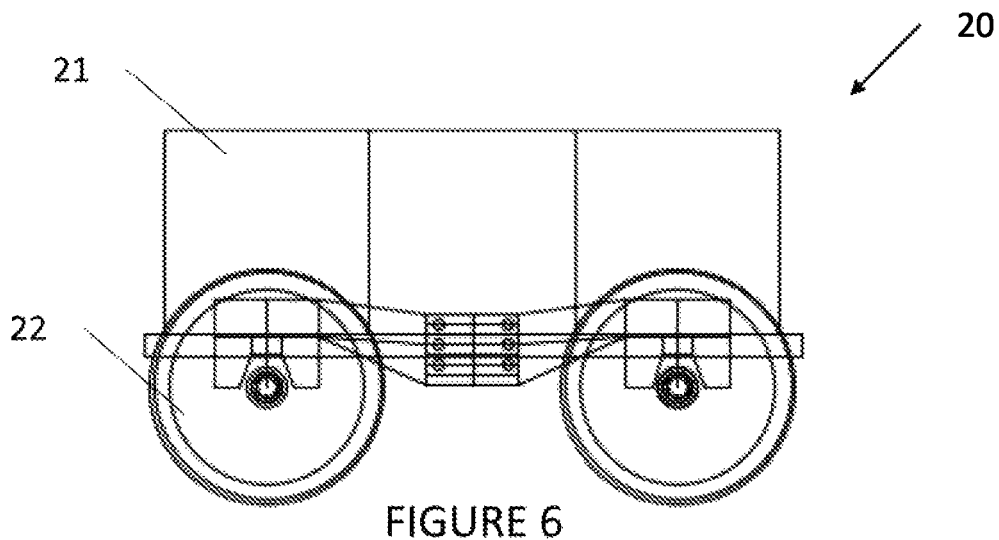
FIG. 6 is a side sectional view of a railway bogey, the bogey forming part of the momentum module of the harvester of FIG. 1.
Figure 7:
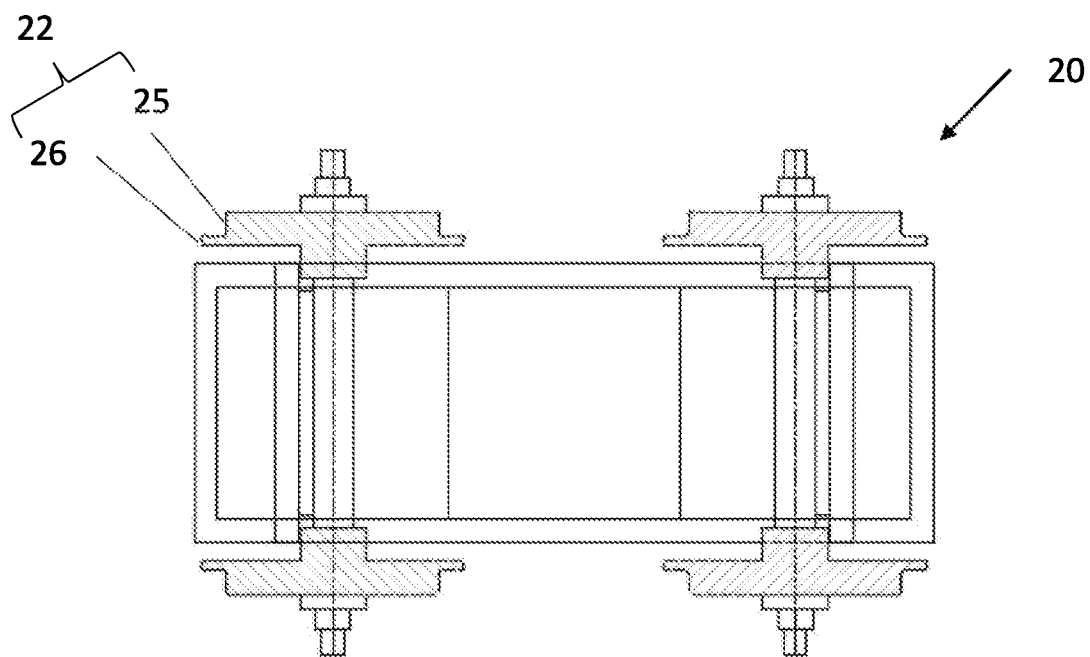
FIG. 7 is a top sectional view of the railway bogey of FIG. 6.

Turning now to FIGS. 6 and 7, the body 15 comprises a plurality of carts 20. The carts 20 are connected to one another such that they travel as a single unit along the track 16. Each cart 20 is configured to carry or haul a ballast 21. The combined mass of the loaded cart 20 can be in the order of 100 tonnes. Depending on the number of carts 20, the total carrying capacity and hence mass of the body 15 can be altered. In the illustrated embodiment, the body 15 consists of three carts 20, however depending on the electricity output desired, there can be a different number of carts 20. For example, it is estimated that a body 15 having a weight of about 90 tonnes can produce a resultant electrical output of about 180 kilowatts. By increasing the mass of the body 15 (through either increasing the mass of the ballast 21 and/or the number of carts 20) the electricity output from the harvester 10 can be increased. Each cart 20 is mechanically coupled to the track 16 via engagement members 22. In the illustrated embodiment, the engagement members 22 are profiled wheels, rotationally mounted to opposing ends of an axle 23.

Returning to FIG. 2. The track comprises a pair of parallel lower rails 24, with an underside of each wheel 22 of the body 15 being respectively engaged therewith. The lower rails 24 are fixed to a lower or bottom surface of the housing 11, extending substantially linearly from a first end to a second end thereof. Each wheel 22 comprises a central tread portion 25 that rests against a contact surface of a respective rail 24 and an outer flange portion 26 that extends around the contact surface of the rail 24, interlocking the wheel 22 therewith. In this embodiment, is understood that the travelling movement of the body 15 is a rolling movement. In alternative embodiments, the travelling movement can instead be a sliding movement or otherwise.

The track 16 further comprises a pair of upper rails 27. The upper rails 27 are generally parallel to the lower rails 24 such that an upper side of each wheel 22 is respectively engaged with an upper rail 27 of the track 16. The upper rails 27 prevent the wheels 22 from lifting from the lower rails 24, hence securing the carts 20 to the track 16. In other embodiments (not shown), different forms of mechanical engagement between the engagement members 22 and the track 16 are contemplated. For example, the engagement members 22 can be bearings configured to run in a groove of a singular rail in a mono-rail like arrangement.

In the exemplary embodiment shown, the carts 17 are railway bogies, with the respective lower 24 and upper 27 rails being regular gauge railway tracks. Accordingly, it is understood that the momentum module 19 does not require the manufacture of bespoke bodies 14 or tracks 15. Rather, existing or decommissioned railway bogies and tracks can be repurposed for use within the harvester 10. By repurposing or recycling existing components, the production costs associated with the harvester 10 can be reproduced, whilst, furthermore, the working life of the railway bogies is increased, reducing waste.

Returning briefly to FIG. 1. Shock absorbers 28 are disposed at either end of the track 16. The shock absorbers are fixedly mounted to the housing 111. The shock absorbers 28 are used to dissipate energy associated with the travelling body 15, as the body 15 reaches the end of the track 16.

Also shown in FIG. 1, locking elements 29 extend from a lower surface of the carts 17. The locking elements 29 are solenoids, that magnetically couple the body 15 in a set position, against gravity. The locking elements 29 are used to release the body 15 at the maximum amplitude of the rotational motion of the platform P. In this manner, peak velocity—and hence maximal kinetic energy—of the travelling body 15 is achieved, optimising the energy output of the harvester 10.

The armature 12 is electrically coupled to a power conditioning unit 30, which is located outside of the housing 11. The power conditioning unit 30 is best shown in FIGS. 4 and 5. Electricity generated by the armature 12 is transmitted to the power conditioning unit 30. It is envisaged that the generated electricity is then transferred to a storage module such as a battery (not shown). Preferably, the battery is a liquid reduction oxidation flow battery. However it is contemplated that lithium ion or other such batteries can also be used. In other embodiments (not shown), it is contemplated that there can be more than one armature coil 12, with each armature coil 12 being electronically connected to the or a power conditioning unit 30.

Figure 8:
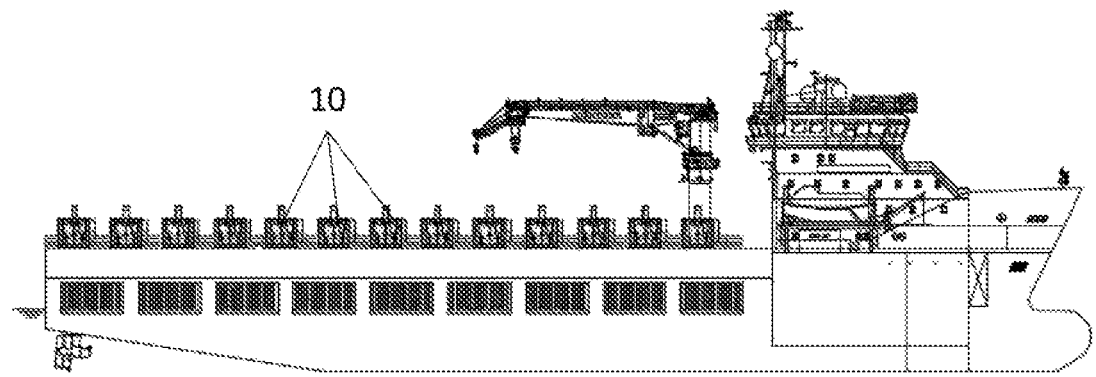
FIG. 8 is a side view of the ship of FIG. 5, illustrating a plurality of harvesters located across the beam thereof.
Figure 9:
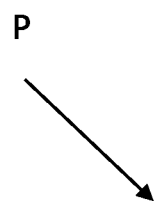
FIG. 9 is a top view of the ship of FIG. 8.
Figure 9:
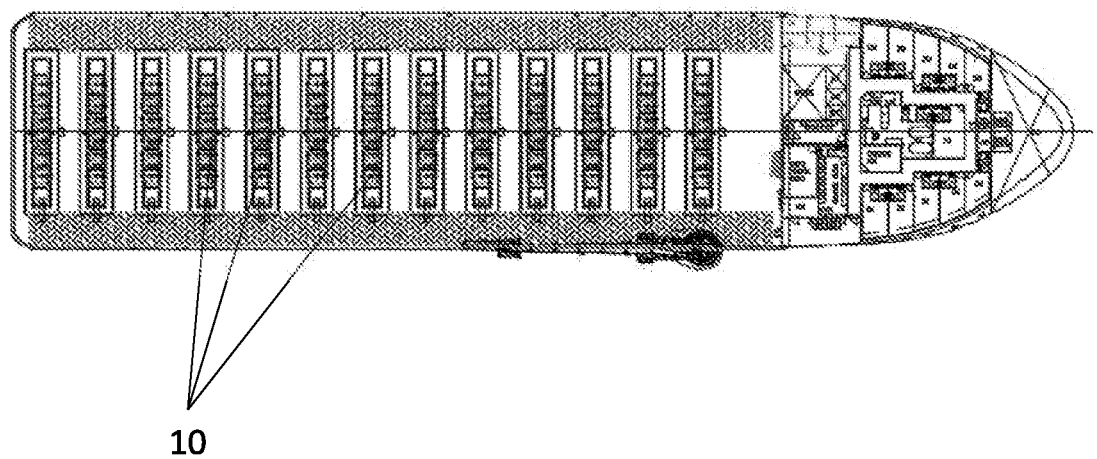

It is contemplated that multiple harvesters 10 can be fitted to a single floating platform P. FIGS. 8 and 9 shows thirteen harvesters disposed aboard the deck of a ship. As illustrated, the harvesters 10 are aligned across the beam of the ship. Accordingly, the respective momentum modules 19 of the harvesters 10 respond to rotational motions of the ship in roll. It is also understood, however, that the harvesters 10 can, alternatively, be aligned along the length or surge of the ship. In such an arrangement, the momentum modules 19 will instead respond to rotational motions of the ship in pitch, resulting from the surge of the waves. In yet another alternative, it is contemplated that the harvester is provided with a turntable (not shown) to enable the momentum module 19 to respond to rotational motions of the ship in pitch and roll. In such an arrangement, either the housing 11 can be attached to the platform P via the turntable, or the tracks 15 can be attached to the housing 11 via the turntable.

Figure 10:
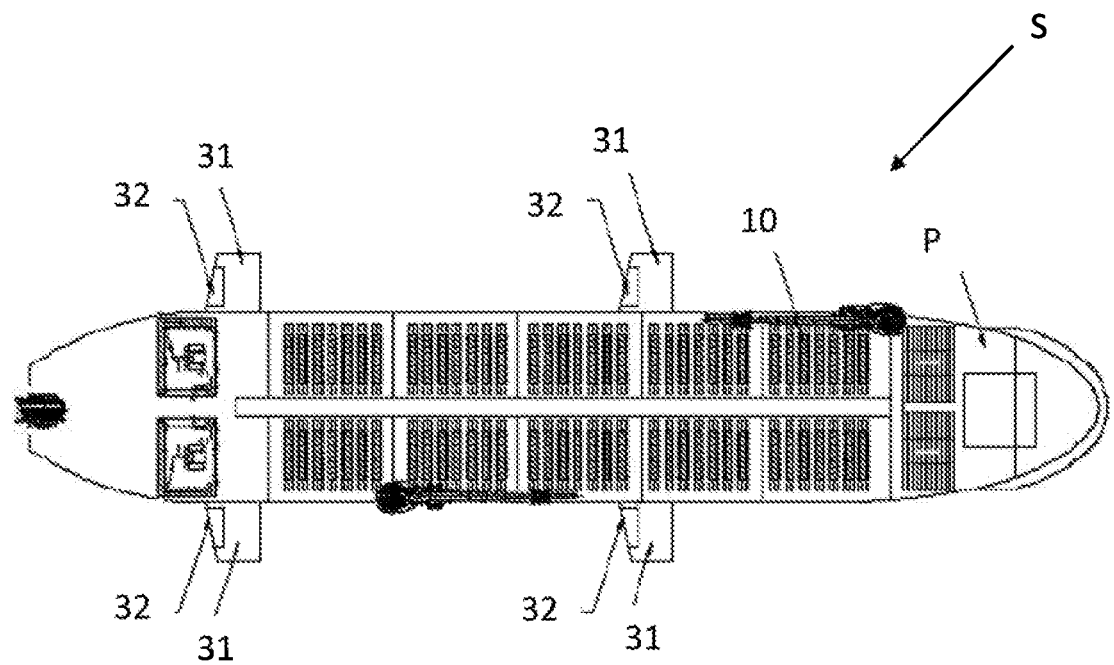
FIG. 10 is a plan view of a ship fitted with aerodynamic devices to augment wave induced motion.
Figure 11:
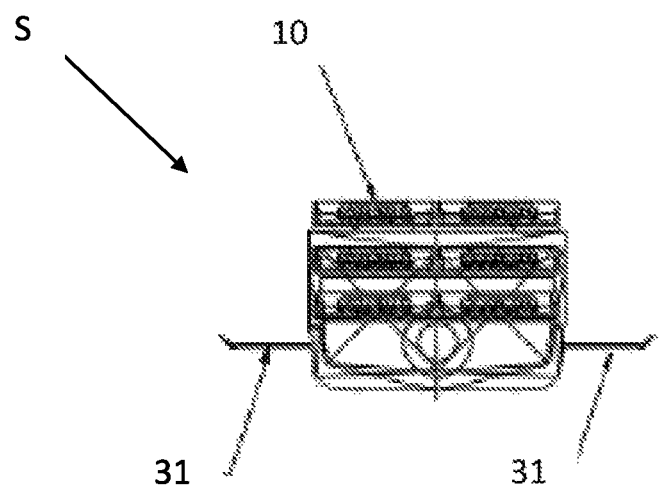
FIG. 11 is a front sectional view of the ship of FIG. 10.

By having multiple harvesters 10 fitted to a single platform P, the total output of energy can be increased. When the harvesters 10 are located aboard a floating vessel such as a ship, it is envisaged that the energy generated can be used to power the propulsion and support systems thereon. In this way, the range of the ship is increased and the reliance on fossil fuel stores are reduced. It is envisaged that such self-propelled ships S can include wave-motion augmentation devices. With reference to FIGS. 10 and 11, aerofoils 31 extend from a side of the ship S, and act as wings to augment roll motion of the ship S. The aerofoils 31 further include moveable control surfaces 32 in the form of ailerons. The ailerons 32 provide control to the roll motion of the ship, further contributing to the energy production of the wave energy harvester 10. For example, when an aileron 32 fitted to the starboard side of the ship is lifted and the aileron 32 fitted to the port side is lowered, the degree of roll of the ship towards the port side will be enhanced. It is envisaged that said ailerons 32 can be controlled remotely through the use of sensors, cameras and the like, thus enabling the ship S to be a remote-controlled ship operable in rough sea conditions without the need for pilot intervention. In alternative embodiments, it is contemplated that the aerodynamic surfaces 31, 32 can extend above the floating platform P, so as to use winds to augment motion of the platform P. In a further alternative, the surfaces can instead be hydrodynamic surfaces adapted to sit on or beneath the water and operate in a matter analogous to aerofoils 31 and ailerons 32.

Similarly, in the case of the harvesters 10 being fitted to stationary concrete gravity structures such as rigs, the electrical energy generated can be used to power the support systems aboard the rig. In both cases, the reliance on and requirement for fossil fuels is reduced or eliminated. Similarly, because the wave motion is continuous, the energy source is also continuous, as opposed to alternative renewables such as solar and wind-based systems.

In addition to the harvester or harvesters 10 enabling the floating platform to become energy self-reliant, it is also contemplated that the harvester 10 and the floating platform P can together provide an electrical energy source for on-shore needs. For example, stationary rigs located close to shore can be electrically connected via transmission lines to on-shore sources, with the electricity generated by the harvesters 10 being transferred into the power grid on-shore. Alternatively, in the case of floating vessels, a concept of "energy fishing" would see the vessel travel out to sea and "fish for energy" to recharge its battery sources via the harvester 10, before returning to dock at land where the energy from onboard battery supplies would the transferred back into the power grid. Both examples above are particularly relevant to island communities and nations whom may be resource scarce and otherwise reliant on supply of fossil fuels from neighbouring land-born countries and communities and nations. The harvester 10 would thus allow such communities to become energy self-sufficient.

Figure 12:
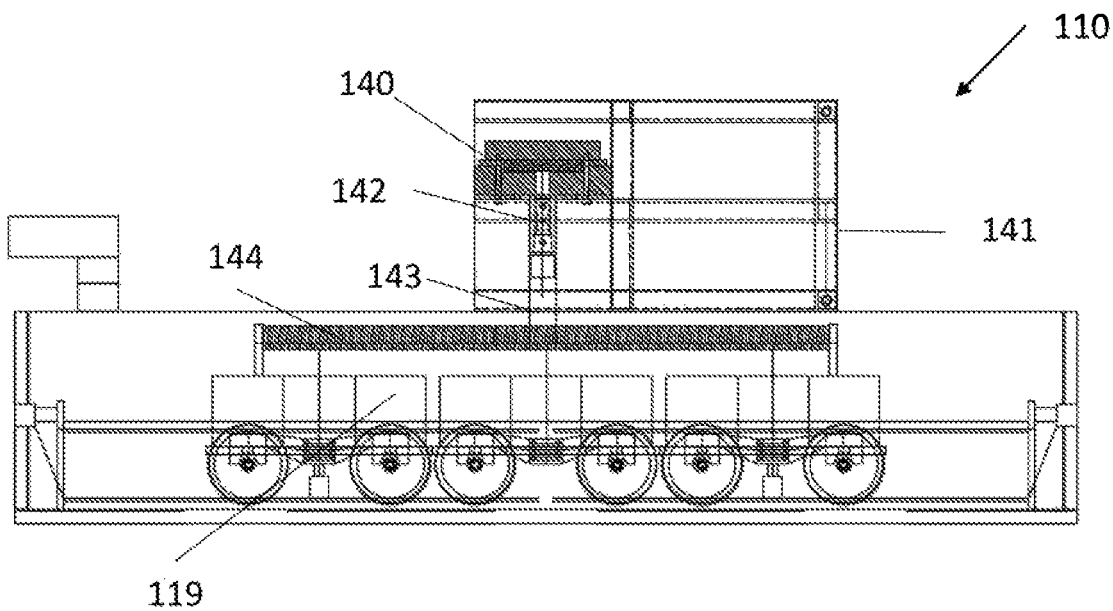
FIG. 12 is a side sectional view of a wave energy harvester according to an alternative embodiment of the invention, showing a momentum module that drives movement of a magnet with respect to an armature via a rack and pinion mechanism to generate electricity.
Figure 13:
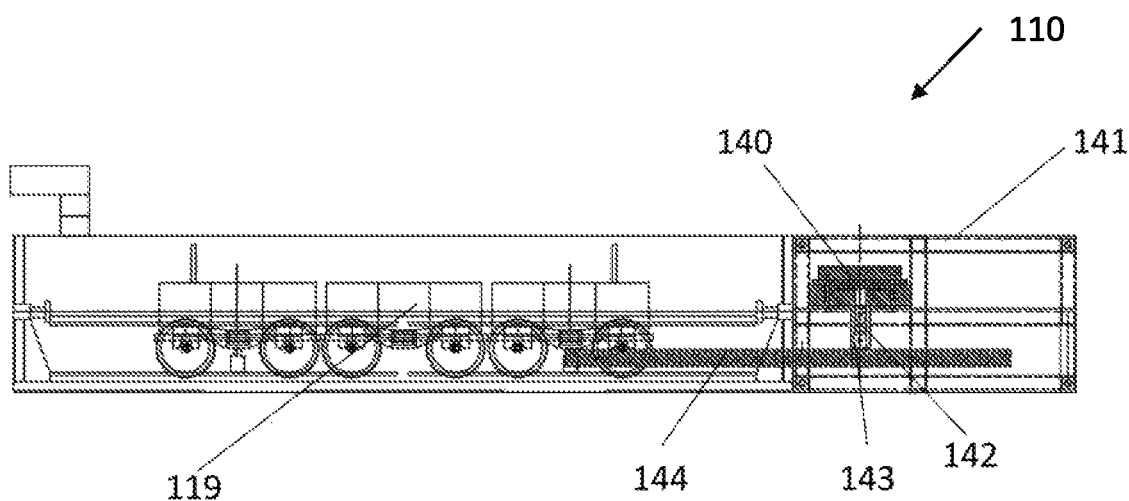
FIG. 13 is a side sectional view of an alternative embodiment of the harvester of FIG. 12.

Moving now to FIGS. 12 and 13, which show an alternative embodiment of the present invention, in which a momentum module 119 is used to drive a rotary generator 130 via a mechanical coupling. For clarity and ease of reference, similar reference numerals are used to describe analogous components.

Wave energy harvester 110 includes momentum module 119 comprising a body 115 and track 116 as substantially described previously is housed within a housing 111. In this embodiment, the armature coil 112 is located within a rotary generator 140. The generator 140 that is mechanically coupled the momentum module 119. As illustrated, the generator 140 is enclosed within an enclosure 141 that is fitted to the housing 111. In an embodiment, the enclosure 141 is fitted on top of the housing 111, with the generator 130 being located substantially mid-way along a length of the track 116. This arrangement is illustrated in FIG. 12. Alternatively, the enclosure 141 can be located at an end of the housing 111, beyond the track 116. This arrangement is illustrated in FIG. 13. It is also contemplated that the generator 140 can instead be located within the housing 111 itself.

The generator 140 includes magnet 113. The magnet 113 is coupled to a shaft 142. The shaft 142 carries an engagement member 143. The engagement member 143 is a pinion gear. The pinion gear 113 has a toothed profile that meshes with a corresponding toothed profile of a second engagement member 144. The second engagement member 144 is a rack, that is fixedly connected to the body 115 of the momentum module 119. FIG. 12 illustrates an embodiment, in which the rack 144 extends along a length of the body 115, being attached at either end thereof to carts 120 via linkages 115. FIG. 13 illustrates an alternative embodiment, with the rack 144 extending from one end of the body 115 to interface with the pinion 143 located at the end of the housing 111.

Accordingly, translation of the body 115 along the track 116 results in a translation of the rack 144. In turn, the linear translation of the rack 144 imparts rotational movement upon the meshing pinion gear 113, and, therefore, magnet 113 coupled to the shaft 142. The relative movement of the magnet 113 with respect to the fixed armature 112 within the generator 140 results in the generation of electricity.

Figure 14:
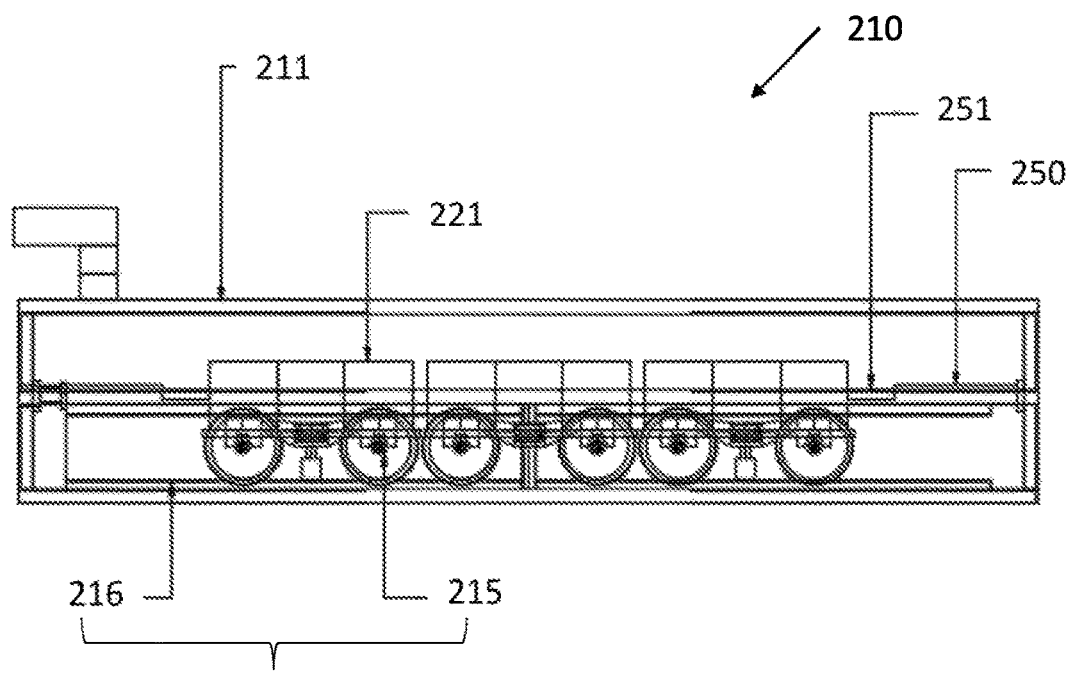
FIG. 14 is a side sectional view of a wave energy harvester according to a further embodiment of the invention, showing a momentum module that drives movement of a magnet with respect to an armature via a hydraulic motor to generate electricity.

Referring now to FIG. 14, in a further embodiment still, a wave energy harvester 210 comprises a momentum module 219 configured to drive a hydraulic motor 250 (not shown) via at least one hydraulic cylinder 251. Specifically, the hydraulic cylinder 251 becomes pressurised with the roll and/or pitch motion of the floating platform. In turn, the hydraulic motor imparts rotation onto a magnet coupled thereto, to thereby induce electricity within an electrical generator 240.

Figure 15:
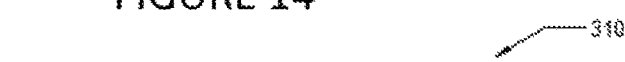
FIG. 15 is a side sectional view of a wave energy harvester according to a further embodiment of the invention, showing a vertically oriented momentum module that is coupled to a buoyancy device.

Moving now to another embodiment of the invention shown in FIG. 15, in the form of wave energy harvester 310. In this embodiment, a momentum module 319 substantially like momentum module 19 previously herein is oriented vertically. This contrasts to embodiments 10, 110 and 210 of the wave energy harvester where the momentum module was substantially horizontal. As such, it is to be understood that momentum module 319 responds to heave motion of the floating platform, as opposed to roll and pitch.

The momentum module 319 is housed within a vertical housing 311. A buoyancy device 360, located within the water underneath the floating platform, is connected to the momentum module 319 via a piston rod arrangement 361. Precise alignment between the buoyancy device 360 and the momentum module 319 is not required as the connection between the piston rod arrangement 361 and the momentum module 319 is not a rigid coupling, providing off-set play therebetween. This assists in minimising construction and installation costs. A boot-like shroud 365 accords additional protection to the piston rod arrangement 361.

The buoyancy device 360 is located within a support cage 362, which is fixedly connected to a bottom of the vertical housing 311. The support cage 362 is provided with several bushings 363, sliding within vertical guide rods 364 of the support cage 362 which constrain motion of the buoyancy device 360 to a substantially vertical or heave motion. Storm dampers (not shown) can be fitted to isolate the buoyancy device 360 from any rough weather encountered.

Due to of the coupling of the piston rod arrangement 361, motion of the buoyancy device 360 is followed by that of the piston rod 361 which in turn causes the translation of the weighted body 315 of the momentum module 319, through the fixed armature coil 312 generating electrical power. When the wave has receded, and a trough is encountered, the buoyancy device 360 drops into the trough, a locking element 319 engages the weighted body 315, retaining it in a raised position. The locking element 319 is then disengaged, allowing the weighted body 315 to fall under gravity, passing through the armature coil 312 at high speed, thereby optimising power generation. In further embodiments (not shown) it is also envisaged that the vertically mounted momentum module 319 can generate electricity via a rotary generator 340 as previously described in relation to wave energy generators 110 and 210.

It is to be understood that with the heave motion of the waves acting on the buoyancy device 360, the wave energy harvester 310 can also be mounted to a stationary platform that is fixed to the seabed via piers. In this way, the wave energy harvester 310 relies solely on the heave motion applied to a buoyancy device 360 alone (and not in addition to the platform P) to drive the momentum module 319.

Summarily, it is understood that the harvester as described herein provides a reliable and effective device for generating electricity from wave energy. The harvester includes a momentum module that is fully enclosed within a sealed housing and uses the roll and/or pitch motion present aboard a floating platform to drive a magnet that directly produces electricity within a stationary armature through magnetic induction. Because the momentum module is isolated from the harsh marine environment, the harvester provides a design that is easy to service and maintain without the need for costly and potentially dangerous underwater inspections. Furthermore, the use of proven and existing railway technology and components in its construction provides a robustness otherwise lacking in conventional wave energy converters, and enables the repurposing of components that would otherwise be discarded as scrap waste.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the example methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

| LEGEND | |
|---|---|
| # No. | Name |
| 10 | Wave energy harvester |
| 11 | Housing |
| 12 | Armature coil |
| 13 | Magnet |
| 14 | Interior of housing |
| 15 | Body |
| 16 | Track |
| 17 | Armature supports |

-continued

| LEGEND | |
|---|---|
| # No. | Name |
| 18 | Armature coils |
| 19 | Momentum module |
| 20 | Cart |
| 21 | Ballast |
| 22 | Engagement members |
| 23 | Axle |
| 24 | Lower rails |
| 25 | Tread portion of wheels |
| 26 | Flange portion of wheels |
| 27 | Upper rails |
| 28 | Shock absorbers |
| 29 | Locking elements |
| 30 | Power conditioning unit |
| 31 | Aerofoil |
| 32 | Aileron |
| 110 | Wave energy harvester |
| 140 | Rotary generator |
| 141 | Generator enclosure |
| 142 | Shaft |
| 143 | Pinion |
| 144 | Rack |
| 210 | Wave energy harvester |
| 250 | Hydraulic motor |
| 251 | Hydraulic cylinder |
| 310 | Wave energy harvester |
| 360 | Buoyancy device |
| 361 | Piston rod |
| 362 | Support cage |
| 363 | Bushings |
| 364 | Vertical Guide Rods |
| 365 | Shroud |
| P | Floating platform |
| F | Magnetic field |
| S | Self-propelled ship |

The invention claimed is:

1. A wave energy harvester, comprising:
a housing locatable aboard a floating platform;
an armature coil mounted to the housing, the armature coil having a moveable magnet associated therewith; and
a momentum module located within the housing, the momentum module including a body that is selectively travelable and configured to drive a corresponding movement of the moveable magnet;
wherein the momentum module includes a track that extends in a substantially flat plane within the housing, the body being travelable therealong;
wherein, in use, kinetic energy of the floating platform is transferred to the momentum module, with reciprocating travel of the body within the housing generating electricity;
wherein the track extends substantially vertically from the floating platform and the body travels in response to periodic heave motion of the floating platform.

2. The wave energy harvester of claim 1, wherein the housing provides an interior that is isolated from a marine environment within which the floating platform is situated.

3. The wave energy harvester of claim 1, wherein the moveable magnet is directly coupled to the body.

4. The wave energy harvester of claim 1, wherein the moveable magnet is carried by the body and the movement of the moveable magnet is a translational movement.

5. The wave energy harvester of claim 4, wherein the travel of the body within the housing moves the moveable magnet through the armature coil.

6. The wave energy harvester of claim 1, wherein the moveable magnet is indirectly coupled to the body.

7. The wave energy harvester of claim 6, further comprising a first engagement member carried by the body that is configured to engage with a second engagement member associated with the armature coil, the moveable magnet being attached to the second engagement member.

8. The wave energy harvester of claim 1, wherein the track extends at least partly along a length of the floating platform and the body travels in response to periodic rotational motion of the floating body in pitch.

9. The wave energy harvester of claim 1, wherein the track extends at least partly across a beam of the floating platform and the body travels in response to periodic rotational motion of the floating body in roll.

10. The wave energy harvester of claim 1, wherein the track is mounted to a turntable fixed to the floating platform thereby enabling the body to travel in response to periodic rotational motion in both roll and pitch.

11. The wave energy harvester of claim 1, further comprising a locking element disposed within the housing and adapted to hold the body in a fixed position against gravitational forces arising from a periodic motion of the floating platform.

12. The wave energy harvester of claim 11, wherein the locking element comprises a solenoid configured to release the body when the periodic motion of the floating platform is at a peak.

13. The wave energy harvester of claim 1, further comprising a shock absorber located towards an end of the housing, the shock absorber adapted to dissipate energy forces associated with stopping the body.

14. The wave energy harvester of claim 1, wherein the body is a railway bogie.

15. A self-propelled vessel, comprising the wave energy harvester of claim 1.

16. The self-propelled vessel of claim 15, further comprising at least one control surface configured to augment wave-induced periodic motion thereof.

17. The self-propelled vessel of claim 16, wherein the at least one control surface is a moveable control surface that is operable to enhance one of roll motion and pitch motion thereof.

18. A wave energy harvester, comprising:
a housing locatable aboard a floating platform;
an armature coil mounted to the housing, the armature coil having a moveable magnet associated therewith;
a momentum module located within the housing, the momentum module including a body that is selectively travelable and configured to drive a corresponding movement of the moveable magnet; and
a shock absorber located towards an end of the housing, the shock absorber adapted to dissipate energy forces associated with stopping the body;
wherein, in use, kinetic energy of the floating platform is transferred to the momentum module, with reciprocating travel of the body within the housing generating electricity.

19. The wave energy harvester of claim 18, further comprising a locking element disposed within the housing and adapted to hold the body in a fixed position against gravitational forces arising from a periodic motion of the floating platform.

20. A self-propelled vessel, comprising a wave energy harvester, wherein the wave energy harvester comprises:
a housing locatable aboard a floating platform;
an armature coil mounted to the housing, the armature coil having a moveable magnet associated therewith; and
a momentum module located within the housing, the momentum module including a body that is selectively travelable and configured to drive a corresponding movement of the moveable magnet;
wherein, in use, kinetic energy of the floating platform is transferred to the momentum module, with reciprocating travel of the body within the housing generating electricity.

* * * * *